United States Patent [19]

Salensky et al.

[11] 4,312,693

[45] Jan. 26, 1982

[54] BONDING OF POLYURETHANE TO SILICONE RUBBER

[75] Inventors: George A. Salensky, Whitehouse Station; Ronald A. Martineau, Irvington, both of N.J.

[73] Assignee: Union Carbide Corporation, New York, N.Y.

[21] Appl. No.: 154,848

[22] Filed: May 30, 1980

Related U.S. Application Data

[63] Continuation of Ser. No. 15,422, Feb. 26, 1979, abandoned.

[51] Int. Cl.³ .............................................. B32B 27/40
[52] U.S. Cl. ..................................... 156/272; 427/39; 427/40; 428/447; 428/425.5; 204/164; 204/165
Field of Search ................................ 427/40; 427/39; 428/447; 428/425.5; 156/272; 204/164, 165

[56] References Cited

U.S. PATENT DOCUMENTS

| | | | |
|---|---|---|---|
| 3,309,299 | 3/1967 | Martell | 204/165 |
| 3,632,386 | 1/1972 | Hurst | 427/40 |
| 3,677,877 | 7/1972 | Metevia et al. | 427/40 |
| 3,853,657 | 12/1974 | Lawton | 427/322 |
| 3,870,610 | 3/1910 | Baird | 204/165 |
| 3,959,105 | 5/1976 | Feneberg et al. | 204/165 |
| 4,072,769 | 2/1978 | Lidel | 427/40 |

Primary Examiner—George F. Lesmes
Assistant Examiner—E. Rollins Buffalow
Attorney, Agent, or Firm—Eugene C. Trautlein

[57] ABSTRACT

Silicone rubber is treated with certain gas plasmas at low pressures and ambient temperatures to improve the adhesion of a polyurethane coating to the silicone rubber.

12 Claims, No Drawings

BONDING OF POLYURETHANE TO SILICONE RUBBER

This application is a continuation of copending application Ser. No. 015,422, filed Feb. 26, 1979 and now abandoned.

BACKGROUND OF THE INVENTION

Silicone rubber has found many uses in applications as the material for protective articles for the human body because silicone rubber exhibits a non-irritating effect on the human skin. One of these many applications is as the transparent material for face masks which are used throughout industry and in the military. However these silicone rubber face masks have exhibited several problems which have largely nullified their advantage of non-irritation. One problem is that the transparent masks are easily scratched and therefore quickly lose their good optical qualities where they are employed in areas containing significant concentrations of abrasive particles such as in outdoor activities, particularly in the military. Another problem is that the silicone masks are permeable to many organic substances which are irritating or even toxic thereby limiting their use in many industrial applications, and in the military as masks to protect against the effect of certain agents used in chemical warfare.

Many materials have been considered as coatings for the silicone rubber in attempts to overcome the deficiencies of silicone rubber as a face mask material. However a problem with these coatings has been encountered due to the requirement that the silicone rubber retain its good elongation properties at low temperatures. A scratch resistant coating which cannot bend and stretch with the silicone rubber would tend to crack and separate from the silicone rubber mask.

Polyurethanes could be an ideal coating for silicone rubber face masks. Polyurethanes provide the abrasion resistance required to prevent stratching of the lens portion of the face mask and at the same time present a barrier to the diffusion of many organic compounds through the face mask. Polyurethanes are also highly flexible even at low temperatures. Unfortunately, polyurethanes have not heretofore been suitable for use as coatings for silicone rubber because they could not be satisfactorily bonded to silicone rubber.

A process which would render silicone rubber adhesive to polyurethane coatings and therefore lead to a good bond between silicone rubber and polyurethanes would be of a great advantage.

SUMMARY OF THE INVENTION

It has now been found that silicone rubber exposed to certain gas plasmas under conditions hereinafter disclosed is rendered adhesive to polyurethane coatings.

DESCRIPTION OF THE INVENTION

In the process of this invention, silicone rubber is unexpectedly and unobviously rendered more adhesive to polyurethane coatings after exposure to certain gas plasmas. The gas use to produce the gas plasma may be either oxygen, nitrogen, carbon dioxide, air or helium. The gas plasma is generated in any of the known gas plasma generators, such as a radio frequency plasma generator, which is energized to produce a radio frequency discharge of from 10 watts to 200 watts, preferably from 25 to 150 watts. The gas plasma generators are well known to those skilled in the art and many are commercially available. Any suitable gas plasma generator can be used by application of conventional sound engineering practices.

The pressure in the gas plasma generator during the exposure of the silicone rubber to the gas plasma is subatmospheric, preferably from 0.1 torr to 100 torr, most preferably from 0.1 torr to 10 torr.

The silicone rubber is exposed to the gas plasma for from 10 seconds to 20 minutes, preferably from 30 seconds to 10 minutes.

The treatment of silicone rubber with gas plasma can be carried out at a temperature of from 0° C. to 100° C.; preferably the treatment is carried out at ambient temperature.

The silicone rubber whose adhesion to polyurethane coatings is greatly improved by the process of this invention is silicone rubber of the general formula:

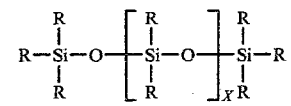

where the R groups can be the same or different and are methyl, ethyl, phenyl, vinyl, allyl, hydroxyl, styryl or hydrogen and where X can be vary from 1000 to 1,000,000. The R groups are reacted during molding operations with peroxide catalysts such as benzoyl peroxide, 2,4-dichlorobenzoyl peroxide, ditertiary butyl peroxide, dicumyl peroxide, 2,5-dimethyl, 2,5-bis(tert butyl peroxy) hexane and the like or other terminally unsaturated compounds to effect crosslinking of the polymer chains. The silicone rubber may also contain from 40 weight percent to 70 weight percent silane treated silica to improve tear strength.

After treatment of the gas plasma the silicone rubber is coated with a polyurethane.

The polyurethane may be applied as a liquid, powder or dispersion. Preferably the polyurethane is applied in liquid form. Contact need not be made immediately after the plasma treatment and a period of open time, the time between and end of the plasma treatment and the time of contact, can be had without sacrificing good adhesion of the silicone rubber of the polyurethane coating. The amount of open time which is sustainable before adhesion deteriorates will depend on which gas is used to generate the gas plasma. It was found that silicone rubber treated with oxygen gas plasma could sustain longer open time than silicone rubber treated with the other gas plasmas employed and still give good adhesion to polyurethane coatings. Open times for oxygen gas plasma treated silicone rubber could exceed 1 hour before adhesion deteriorated, while the open time for silicone rubber treated with the other gas plasmas could not exceed 1 hour.

The polyurethane coatings which are useful in the process of this invention are the polyurethanes of the general formula:

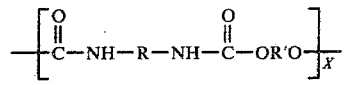

where

R is alkyl, linear, branched or cyclic, substituted or unsubstituted having from 2 to 36 carbon atoms such ethyl, propyl, cyclohexyl, methyl cyclohexyl, methylene dicyclohexyl, bis(cyclohexyl)methane, 4,4'-dicyclohexyl methane, 3,5,5-trimethyl cyclohexyl, methyl ester of lysine, biuret adduct of hexamethylene diisocyanate and the like;

or arlkyl such as tolyl, xylyl and the like;

and where R' is alkyl, linear, branched or cylic, substituted or unsubstituted having from 1 to 12 carbon atoms such as methyl, ethyl, cyclohexyl, dodecyl and the like;

and where X represents an integer having a value of from 100 to 10,000 when the polyurethane is cured.

It is desirable that the nitrogen atoms of the urethane groups be directly bonded to a methylene group rather than to an aromatic carbon in order to diminish the chance of yellowing.

In a typical embodiment silicone rubber is placed a RF plasma generator. The air in the chamber is removed and replaced by oxygen, at a pressure of about 1 torr and the plasma generator then energized at 13.56 MegaHertz to develop a radio frequency discharge of 50 watts; the silicone rubber is exposed to the gas plasma discharge for 5 minutes. After this treatment, and after 1 minute of open time the silicone rubber is coated with the polyurethane coating composition and the polyurethane cured at ambient temperature for 48 hours. Generally a strong adhesive bond forms.

The process of this invention renders silicone rubber much more adhesive to polyurethane coatings than was heretofore possible. Of particular interest is the use of silicone rubber in the manufacture of facial protective devices. Now, polyurethanes, which have excellent abrasion resistance characteristics and act as effective barriers to the diffusion of many organic substances, can be applied to the surface of the silicone rubber, which has been treated with the gas plasma process of this invention, and will form a good adhesive bond. The resulting composite can then be manufactured into many useful articles such as protective devices for the facial area. An added benefit is that the polyurethane coating will not crack or peel even at lower than ambient temperatures thereby allowing the silicone rubber to retain its good elongation and pliability characteristics without the loss of the protective coating.

Although plasma treatment of polymeric materials such as polyolefins and polyesters for adhesion enhancement is known, it has not heretofore been known in the application of treating silicone rubber to enhance its adhesion to polyurethane coatings. Attempts have been made to employ amine impregnants and surface active agents with silicone rubber to improve its adhesion to polyurethanes without success. Thus, it was completely unexpected and unobvious to find that silicone rubber when treated with certain gas plasmas at low pressure would have its adhesion to polyurethane improved to such a significant extent.

The following examples serve to further illustrate the invention.

EXAMPLE 1

A piece of silicone rubber measuring 5.1 centimeters by 0.32 centimeters was wiped with isopropanol to remove finger prints and surface contamination and dried at ambient temperature.

The silicone rubber used was a blend of copolymers trimethyl siloxane, methyl vinyl siloxane, dimethyl siloxane and phenyl ethyl siloxane, containing about 40 weight percent of fumed silica, having an average molecular weight of 10,000, cured by molding to sheet form using 2,5-dimethyl 2,5-bis(tert butyl peroxy) hexane as the cure catalyst. The silicone rubber was placed in a RF plasma generator whose chamber measured 12.7 centimeters by 12.7 centimeters by 17.8 centimeters. The chamber was evacuated to 0.05 torr to remove air from the chamber and oxygen was bled into the chamber at a rate sufficient to maintain the pressure at 1 torr. The plasma generator was then energized at 13.56 MegaHertz and developed a radio frequency discharge of 50 watts which was maintained for 5 minutes. Thereafter the exposed silicone rubber was removed and after 1 minute of open time following the gas plasma treatment, the silicone rubber was coated with a two package polyurethane coating, the first part containing 32 parts by weight of a polycaprolactone polyol as described in U.S. Pat. No. 4,045,474 having a hydroxy number of 400 mg KOH/g, an equivalent weight of 140 gm/OH and a functionality of 6, 0.1 parts by weight of a silicone flow control agent, 0.01 parts by weight of dibutyl tin dilaurate and 20 parts by weight of ethoxyethyl acetate and the second part containing 68 parts by weight of a 75 percent solution of the biuret adduct of hexamethylene diisocyanate in ethylene glycol monoethyl ether acetate. The two parts were mixed and stirred thoroughly immediately before the coating was applied to the silicone rubber. The coating was cured overnight at ambient temperature and the adhesion was evaluated by the cross hatch adhesion test (ASTM-D-3359). The polyurethane coating could not be pulled off signifying good adhesion. It was also observed that the silicone rubber could be folded over upon itself and stretched without separation of the polyurethane coating.

For comparative purposes two similar pieces of silicone rubber which did not undergo the gas plasma treatment were coated with the same polyurethane coating. One of these two pieces was coated with a silicone room temperature vulcanizing tie coat, having a viscosity of about 55,000 cps and a specific gravity of 1.26, before the polyurethane coating was applied; the other was not. The coatings were cured and evaluated as before. The coating without the tie coat showed no adhesion and the coating with the tie coat was easily pull off.

The results obtained establish the use of the process of this invention renders silicone rubber adhesive to a polyurethane coating when the silicone rubber is treated with an oxygen gas plasma.

EXAMPLE 2

Eight pieces of silicone rubber of the same size and type as those used in Example 1 were prepared in a manner similar to that described in Example 1. They were placed individually in the RF plasma generator described in Example 1 and then exposed to one of four gas plasmas, either oxygen, nitrogen, carbon dioxide or air following the procedure described in Example 1. The radio frequency discharge used was either 50, 100 or 150 watts. In all cases the exposure was for 5 minutes at 1 torr plasma pressure. After 1 minute of open time, each piece of silicone rubber was coated with a single package moisture curable polyurethane coating composed of 42 weight percent of a polycaprolactone polyol having an average molecular weight of 540, a hydroxyl no. of 310 mg. KOH/g and acid no. of 0.3 mg.

KOH/g, and 58 weight percent of 4,4'methylene-bis(cyclohexylisocyanate). The polyurethane coating had been prepared by the following procedure. To a reactor there were charged 4,4'-methylene-bis(cyclohexylisocyanate) and dibutyl tin dilaurate as catalyst. The polycaprolactone polyol was then added in solution with a solvent composed of a 50/50 mixture of ethylene glycol monoethyl ether acetate and xylene over a three-hour period at a rate such that the reaction temperature did not exceed 40° C. The complete reaction mixture was then maintained at 40° C. for about three hours, until the free isocyanate content indicated that the reaction was completed. The coatings were cured at ambient temperature for 48 hours and evaluated for adhesion using the test described in Example 1. The adhesion was rated either Good or Fair corresponding to the following criteria:

Good—Coating could not be pulled off the silicone rubber
Fair—Adhesion was spotty The results are shown in Table I.

TABLE I

| Gas Plasma | Power (watts) | Adhesion | ASTM 3359 |
|---|---|---|---|
| Oxygen | 50 | Good | 5 |
| Oxygen | 100 | Good | 5 |
| Nitrogen | 50 | Fair | 3 |
| Nitrogen | 100 | Fair–Good | 4 |
| Carbon Dioxide | 50 | Fair–Good | 4 |
| Carbon Dioxide | 150 | Fair | 3 |
| Air | 50 | Fair–Good | 4 |
| Air | 150 | Good | 5 |

For comparative purposes a similar piece of silicone rubber which did not undergo the gas plasma treatment was coated with the same polyurethane coating and cured and evaluated as before. In this instance there was no adhesion (ASTM-3359=0) between the silicone rubber and the polyurethane coating. This example establishes that by use of the process of this invention, silicone rubber becomes strongly adhesive to polyurethane coating. The data also indicates that better results were obtained when an oxygen gas plasma was used.

EXAMPLE 3

Seventeen pieces of silicone rubber of the same size and type as that used in Example 1 were prepared in a manner similar to that described in Example 1. They were placed individually in the gas plasma apparatus described in Example 1 and the exposed to one of the four gas plasmas, either oxygen, nitrogen, helium or argon following the procedure described in Example 1. Each piece of silicone rubber was exposed to the gas plasma at a power of 50 watts and a 1 torr pressure for 5 minutes. The open time, the time delay before the silicone rubber piece was coated with the polyurethane, was varied for each piece. After the specified amount of open time, each piece was coated with the polyurethane coating described in Example 2. The coatings were cured at ambient temperature for 48 hours and then evaluated for adhesion using the test described in Example 1. The adhesion was rated either Good, Fair or Poor corresponding to the following criteria:

Good—Coating could not be pulled off the silicone rubber
Fair—Adhesion was spotty
Poor—Coating pulled off easily The results are shown in Table II

TABLE II

| Gas Plasma | Open Time | Adhesion | ASTM 3359 |
|---|---|---|---|
| Oxygen | 1 min. | Good | 5 |
| Oxygen | 30 min. | Good | 5 |
| Oxygen | 1 hr. | Good | 5 |
| Oxygen | 5 hrs. | Fair | 3 |
| Oxygen | 24 hrs. | Poor | 1 |
| Nitrogen | 30 min. | Good | 5 |
| Nitrogen | 1 hr. | Good | 5 |
| Nitrogen | 5 hrs. | Fair–Poor | 2 |
| Nitrogen | 24 hrs. | Poor | 1 |
| Helium | 30 min. | Good | 5 |
| Helium | 1 hr. | Fair–Poor | 2 |
| Helium | 5 hrs. | Fair–Poor | 2 |
| Helium | 24 hrs. | Fair–Poor | 2 |
| Argon | 30 min. | Fair–Poor | 2 |
| Argon | 1 hr. | Fair–Poor | 2 |
| Argon | 5 hrs. | Poor | 1 |
| Argon | 24 hrs. | Poor | 1 |

For comparative purposes a similar piece of silicone rubber which did not undergo the gas plasma treatment was coated with the same polyurethane coating and cured and evaluated as before. In this instance there was no adhesion between the silicone rubber and the polyurethane coating.

This example illustrates that the process of this invention will render silicone rubber adhesive to a polyurethane coating resulting in much improved adhesion over that obtained when the process is not employed, when the process of this invention uses an oxygen, nitrogen or helium gas plasma and an open time of 5 hours or less for oxygen, 3 hours or less for nitrogen and 1 hour or less for helium. For comparative purposes the process of this invention was employed using an argon gas plasma. As shown in Table II, satisfactory adhesion was not obtained when the open time was 30 minutes or more.

For comparative purposes to show the effect of open time, open times greater than the limits described above as leading to good results were used. As shown in Table II, the adhesion obtained in these cases were judged to be fair to poor if the open time was too long.

EXAMPLE 4

The polyurethane coating used in this example was prepared as follows. To a flask there were charged 147 parts by weight polytetramethylene ether glycol having an average molecular weight of 980, 100 parts by weight of polytetramethylene ether glycol having an average molecular weight of 2020 and 152 parts by weight of toluene. The air in the flask was displaced with nitrogen gas. To this mixture was added 109 parts by weight of 4,4'-methylene-bis(cyclohexylisocyanate) and 4 parts by weight of dibutyl tin dilaurate and the resulting mixture was heated at from about 70° C. to about 80° C. for 5 hours until the free isocyanate content was reduced to 3.6 weight percent. Then 60 grams of dried 1,4 cyclohexane dimethanol was added and held at 80° C. for one hour and the resulting mixture was diluted with 152 grams of n-butanol. The polyurethane coating was prepared by combining 104 parts by weight of the mixture prepared about with 7.5 parts by weight of hexamethoxymethyl melamine, 20 parts by weight of methanol and 0.3 parts by weight of p-toluene sulfonic acid.

Eight pieces of silicone rubber of the same size and type as that used in Example 1 were prepared in a manner similar to that described in Example 1. They were placed individually in the gas plasma apparatus described in Example 1 and then exposed to one of four gas plasmas, either oxygen, nitrogen, carbon dioxide or air following the procedure described in Example 1. The radio frequency discharge was either 50, 100 or 150 watts. In all cases the exposure was for 5 minutes at 1 torr pressure. After 1 minute of open time, each piece of silicone rubber was coated with the polyurethane coating prepared above. The coating was then cured by heating in an oven for 45 minutes at 125° C. The coatings were evaluated for adhesion using the test described in Example 1. In all eight cases the polyurethane coating could not be pulled off the silicone rubber, indicating good adhesion. The results are shown in Table III.

TABLE III

| Plasma | Power (watts) | Adhesion | ASTM 3359 |
|---|---|---|---|
| Oxygen | 50 | Good | 5 |
| Oxygen | 100 | Good | 5 |
| Nitrogen | 50 | Good | 5 |
| Nitrogen | 100 | Good | 5 |
| Carbon Dioxide | 50 | Good | 5 |
| Carbon Dioxide | 150 | Good | 5 |
| Air | 50 | Good | 5 |
| Air | 150 | Good | 5 |

For comparative purposes, a similar piece of silicone rubber which did not undergo the gas plasma treatment was coated with the same polyurethane coating. The coating was cured and evaluated in the same manner. The adhesion was spotty (ASTM-3359=3) between the silicone rubber and the polyurethane coating.

This example illustrates that the process of invention results in good adhesion of the silicone rubber and the polyurethane coating when either oxygen, nitrogen, carbon dioxide or air gas plasmas are employed at 50 watts to 150 watts for 5 minutes exposure at 1 torr pressure and 1 minute of open time. Adhesion is significantly improved over that obtained when the process of this invention is not employed.

What is claimed is:

1. A process for producing a laminate by the adhesion of the surface of silicone rubber to polyurethane consisting of rendering the surface of silicone rubber adhesive to polyurethane by contacting the silicone rubber with a gas plasma for from 10 seconds to 20 minutes at subatmospheric pressure, wherein said gas plasma is selected from the group consisting of oxygen, nitrogen, carbon dioxide, air and helium gas plasmas, and, within about 60 minutes of the end of said contacting, bringing the silicone rubber in pressure contact with polyurethane whereby the polyurethane adheres to the silicone rubber.

2. A process as claimed in claim 1 wherein the nitrogen atoms of said polyurethane are bonded directly to aliphatic carbon atoms.

3. A process as claimed in claim 1 wherein the said pressure is from 0.1 to torr to 100 torr.

4. A process as claimed in claim 1 wherein the said pressure is from 0.1 to 10 torr.

5. A process as claimed in claim 1 wherein the silicone rubber is exposed to the gas plasma for from 30 seconds to 10 minutes.

6. A process as claimed in claim 1 wherein the silicone rubber is brought in pressure contact with the polyurethane within about 1 minute of the end of the contacting of the silicone rubber with the gas plasma.

7. A process as claimed in claim 1 wherein said gas plasma is oxygen.

8. A process as claimed in claim 1 wherein said gas plasma is nitrogen.

9. A process as claimed in claim 1 wherein said gas plasma is carbon dioxide.

10. A process as claimed in claim 1 wherein said gas plasma is air.

11. A process as claimed in claim 1 wherein said laminate is optically clear.

12. A process as claimed in claim 1 wherein said laminate is in the form of a protective mask.

* * * * *